US008136741B2

(12) United States Patent
Hanneke et al.

(10) Patent No.: US 8,136,741 B2
(45) Date of Patent: Mar. 20, 2012

(54) FUEL INJECTION DEVICE FOR AN INTERNAL COMBUSTION ENGINE USING DIRECT FUEL INJECTION

(75) Inventors: Juergen Hanneke, Stuttgart (DE); Nadja Eisenmenger, Stuttgart (DE); Achim Brenk, Kaempfelbach (DE); Lorenz Zerle, Augsburg (DE); Michael Mennicken, Wimsheim (DE); Helmut Clauss, Eberdingen (DE); Hans-Christoph Magel, Pfullingen (DE); Dirk Vahle, Asperg (DE); Andreas Kellner, Tamm (DE); Hrvoje Lalic, Ludwigsburg (DE); Joachim Boltz, Stuttgart (DE); Falko Bredow, Remseck (DE); Martin Katz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/996,558

(22) PCT Filed: May 31, 2006

(86) PCT No.: PCT/EP2006/062779
§ 371 (c)(1), (2), (4) Date: Jan. 23, 2008

(87) PCT Pub. No.: WO2007/012510
PCT Pub. Date: Feb. 1, 2007

(65) Prior Publication Data

US 2008/0210787 A1 Sep. 4, 2008

(30) Foreign Application Priority Data

Jul. 25, 2005 (DE) ......................... 10 2005 034 599
Mar. 2, 2006 (DE) ......................... 10 2006 009 659

(51) Int. Cl.
*F02M 47/02* (2006.01)
*F16K 31/02* (2006.01)

(52) U.S. Cl. ................ 239/91; 239/88; 239/89; 239/92; 239/585.1; 239/533.1; 251/129.02; 251/58

(58) Field of Classification Search .............. 239/88–92, 239/569, 533.1, 585.1; 251/129.01–129.09
See application file for complete search history.

(56) References Cited

U.S. PATENT DOCUMENTS

| | | | | |
|---|---|---|---|---|
| 6,547,213 | B1 | 4/2003 | Heinz et al. | |
| 6,808,125 | B2 * | 10/2004 | Ruthardt et al. | 239/89 |
| 6,974,093 | B2 * | 12/2005 | Yamada et al. | 239/533.2 |
| 7,083,113 | B2 * | 8/2006 | Kropp et al. | 239/92 |
| 7,188,782 | B2 * | 3/2007 | Magel | 239/96 |
| 7,273,185 | B2 * | 9/2007 | Magel | 239/88 |
| 2004/0154562 | A1 | 8/2004 | Mattes et al. | |
| 2007/0152080 | A1 * | 7/2007 | Boecking | 239/102.2 |

FOREIGN PATENT DOCUMENTS

| | | |
|---|---|---|
| DE | 101 64 123 | 1/2003 |
| DE | 102 17 594 | 11/2003 |
| DE | 102 25 686 | 1/2004 |
| DE | 10 2004 002 299 A1 | 8/2005 |
| WO | WO 03/064847 A1 | 8/2003 |

* cited by examiner

*Primary Examiner* — Len Tran
*Assistant Examiner* — James Hogan
(74) *Attorney, Agent, or Firm* — Ronald E. Greigg

(57) ABSTRACT

Disclosed is a fuel injection device comprising a housing and a valve element disposed therein and cooperating with a valve seat located in the area of at least one fuel discharge port. The valve element is composed of several parts while at least two parts of the valve element are coupled to each other via a hydraulic coupler.

20 Claims, 5 Drawing Sheets

FUEL INJECTION DEVICE FOR AN INTERNAL COMBUSTION ENGINE USING DIRECT FUEL INJECTION

CROSS-REFERENCE TO RELATED APPLICATION

This application is a 35 USC 371 application of PCT/EP2006/062779 filed on May 31, 2006.

BACKGROUND OF THE INVENTION

1. Field of the Invention

The invention relates to an improved fuel injection device for an internal combustion engine with direct fuel injection.

2. Description of the Prior Art

A fuel injection device with which the fuel can be injected directly into a combustion chamber, assigned to it, of an internal combustion engine is known on the market. For that purpose, a valve element is disposed in a housing, and in a region of a fuel outlet opening, the valve element has a pressure face that acts overall in the opening direction of the valve element. On the opposite end of the valve element, there is a control face acting in the closing direction, which defines a control chamber. The control face acting in the closing direction is larger overall than the pressure face that when the valve element is open acts in the opening direction.

When the fuel injection device is closed, in a region of the pressure face acting in the opening direction aid of the control face acting in the closing direction, a high fuel pressure prevails, of the kind furnished for instance by a fuel collection line (or "rail"). For opening the valve element, the pressure applied to the control face is lowered, until the hydraulic force resultant, acting in the opening direction, at the pressure face exceeds the force acting in the closing direction. As a results opening of the valve element is accomplished.

A prerequisite for the mode of operation of this fuel injection device is sealing between every region in which the comparatively small pressure face, acting in the opening direction, is present, and the region of the valve element in which the comparatively large control face, acting in the closing direction, is present. Leakage fluid, in the known fuel injection device, is carried away from the region of the seal via a leakage line.

The object of the present invention is to refine a fuel injection device of the type defined at the outset in such a way that it is as simple and economical as possible in construction and can be used at a very high operating pressure.

SUMMARY AND ADVANTAGES OF THE INVENTION

In the fuel injection device of the invention, as a result of the hydraulic coupling of two separate parts of the valve element, the freedom in designing the fuel injection device is increased considerably, since the various parts of the valve element can each be optimally adapted to the specific location inside the fuel injection device. For instance, the elastic properties of the valve element can be optimally adapted to the intended region of use by means of a suitable choice of the material employed and of the dimensions. Moreover, the manufacture of the valve element overall is substantially simplified, since parts of constant diameter can also be used. This makes a simpler construction of the fuel injection device possible, with simpler parts; this both facilitates production and also makes a smaller mode of construction possible. For implementing the present invention, it is furthermore possible to continue to use numerous components of previous devices.

A further advantage of the hydraulic coupler is the compensation for tolerances, which simplifies both production and assembly. Coupling two parts of the valve element by means of a hydraulic coupler moreover makes it possible to implement a certain motion damping. By means of a sleeve element, the hydraulic coupler can be implemented very simply.

It is especially advantageous if in all the chambers that surrounds the valve element and are located between a control chamber and a pressure chamber, at least approximately the high fuel pressure that prevails at the high-pressure connection prevails during operation (the valve element "floats" in high pressure), and if the valve element has a hydraulic control face acting in the closing direction and a hydraulic pressure face acting in the opening direction. This means nothing other than that in such a device, a pressure step that was previously required between the pressure face and the control face is no longer necessary. A valve element that "floats" in high pressure can be implemented for instance by providing that the recess in which the valve element overall is received communicates with the high-pressure connection. By means of a larger control face (acting in the closing direction), secure closure of the valve element is also assured in the event of a lessening, caused by wear to the seat toward the housing, of the difference in surface area and an attendant reduction in the force acting in the closing direction (drift in the closing force).

Since a pressure step with a low-pressure chamber required for it can be dispensed with and the valve element overall "floats" in the high pressure, a low-pressure region is no longer present. Hence no leakage can occur between the high-pressure region and such a low-pressure region, and thus the corresponding sealing and a requisite leakage line for the purpose can be dispensed with. Dispensing with a pressure step also means that the valve element rests statically with only a comparatively low closing force on the valve seat toward the housing, which lessens the aforementioned drift.

The fuel injection device of the invention furthermore operates at high efficiency, since the leakage existing in earlier devices between the valve element and the housing is no longer present. As a consequence, a return line can be designed smaller.

If the end face, located in the hydraulic coupler, of the part of the valve element that is remote from the fuel outlet openings of the fuel injection device is larger than the end face of the other part, then when the valve element is open, a hydraulic spring acting in the closing direction is "tensed" by the hydraulic coupler, which reinforces a secure closure of the valve element.

If the pressure face and control face are at least approximately the same size, then the valve element overall is in pressure equilibrium, with suitably high dynamics. The force excess in the closing direction required for the closure can be implemented in this case by a slight throttling in the region of the pressure face, and/or by throttling of the fuel flow that reaches the pressure face.

The assembly of the fuel injection device is simplified if the valve element is received in its entirety in a high-pressure chamber that communicates with the high-pressure connection. The high-pressure chamber car furthermore function as a damping volume, by means of which pressure waves and consequently wear to a valve seat can be reduced. In addition, the precision of the injection quantities upon multiple injection increases. Furthermore, manufacture is simplified, since a separate high-pressure bore for connecting the pressure chamber to the high-pressure connection can be dispensed with.

BRIEF DESCRIPTION OF THE DRAWINGS

Especially preferred exemplary embodiments of the present invention will be described in further detail below in conjunction with the accompanying drawings, in which.

DESCRIPTION OF THE PREFERRED EMBODIMENTS

Figure 1:
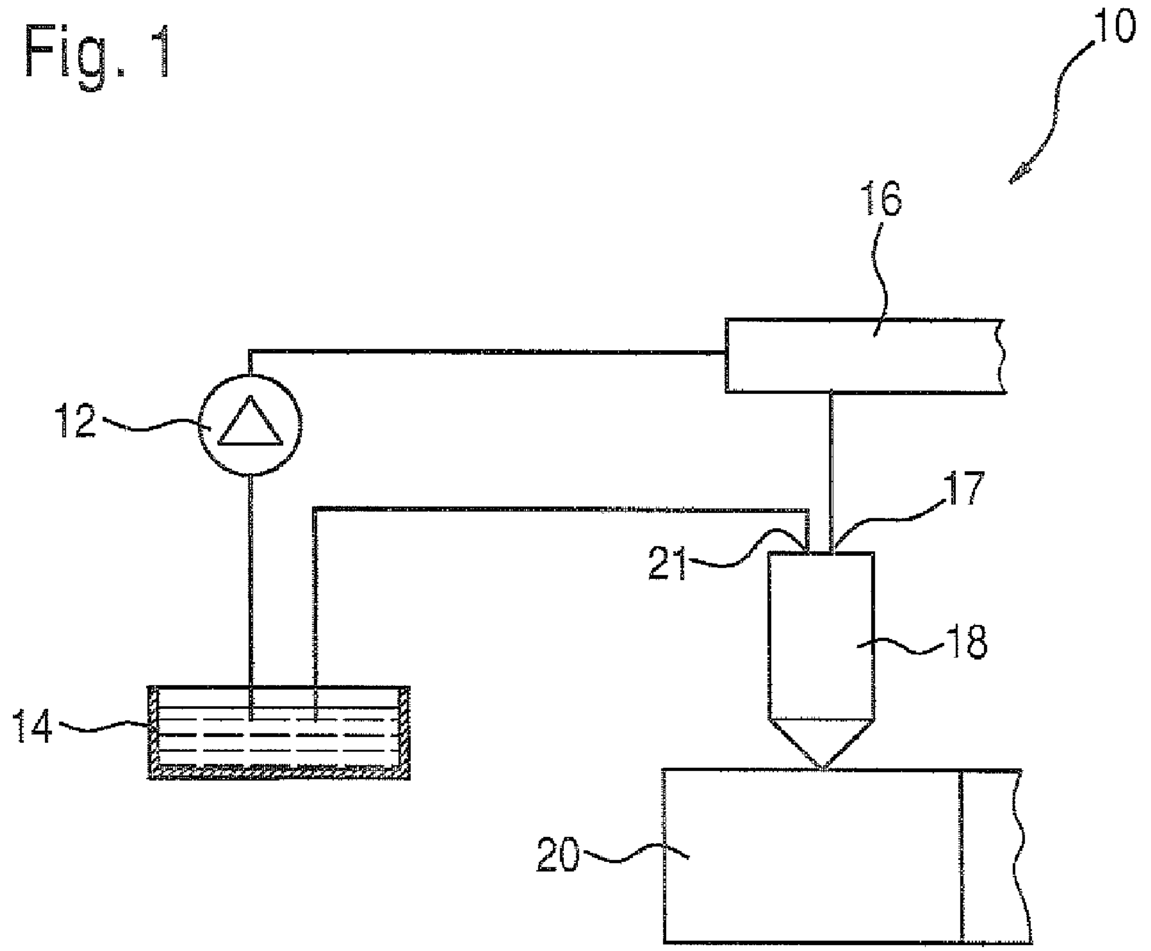
FIG. 1 shows a schematic view of an internal combustion engine with a fuel injection device.

In FIG. 1, an internal combustion engine is identified overall by reference numeral 10. It serves to drive a motor vehicle, not shown. A high-pressure pumping device 12 pumps fuel from a fuel tank 14 into a fuel pressure reservoir 16 (or "rail"). The fuel—diesel or gasoline—is stored in it at very high pressure. Each by means of a respective high-pressure connection 17, a plurality of fuel injection devices 18 are connected to the rail 16 and inject the fuel directly into combustion chambers 20 assigned to them. The fuel injection devices 18 each also have a low-pressure connection 21, by way of which they communicate with a low-pressure region, in this case the fuel tank 14.

Figure 2:
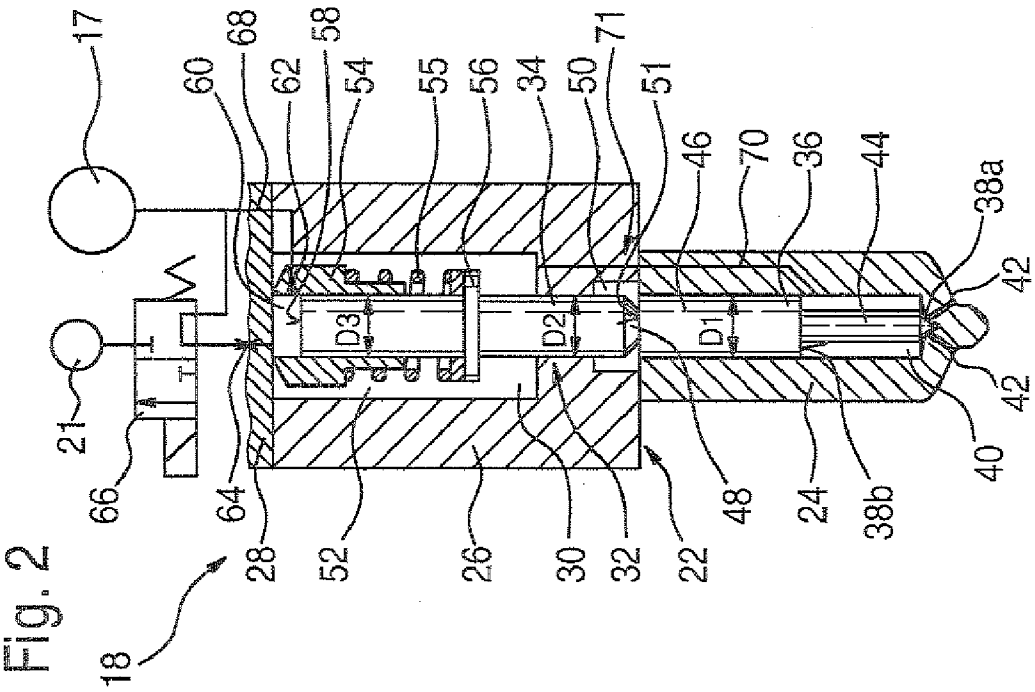
FIG. 2 is a schematic, partly sectional view of a first embodiment of the fuel injection device of FIG. 1.

The fuel injection devices 18 in a first embodiment may be embodied in accordance with FIG. 2: The fuel injection device 18 shown there includes a housing 22 with a nozzle body 24, a main body 26, and an end body 28. In the housing 22, in its longitudinal direction, there is a stepped recess 30, in which a needle-like valve element 32 is received. This valve element is embodied in two parts, with a control piston 34 and a nozzle needle 36.

The nozzle needle 36, on its lower end in terms of FIG. 2, has a conical pressure face 38*a*, which defines a pressure chamber 40. In the region of the pressure face 38*a*, the nozzle needle 36 cooperates in a manner not show in detail in FIG. 2 with a valve seat of the housing. In this way, fuel outlet openings 42 can be disconnected from the pressure chamber 40 or made to communicate with it. It is understood that whenever the nozzle needle 36 rests with the pressure face 38*a* on the valve seat of the housing, only a region of the pressure face 38*a* located upstream of the valve seat is subjected to the pressure prevailing in the pressure chamber 40. Not until the nozzle needle 36 lifts from the valve seat is an increased pressure also applied to a region of the pressure face 38*a* located downstream of the valve seat. However, this is not shown in the drawing, for the sake of simplicity.

The nozzle needle 36 has one portion 44 of smaller diameter and one portion 46 of larger diameter. Between them is a shoulder which likewise forms a pressure face acting in the opening direction of the valve element 32; this pressure face is identified by reference numeral 38*b*. With the portion 46, the nozzle needle 36 is guided longitudinally displaceably in the nozzle body 24.

The control piston 34 is guided in the main body 26. Its lower end extends, with an end face 48 that in the present exemplary embodiment is chamfered conically, into a widening of the recess 30 that forms a coupling chamber 50. This chamber will be addressed in further detail hereinafter. An axial end face 51 of the nozzle needle 36, which is the upper end face in terms of FIG. 2, protrudes into the coupling chamber 50. The upper end, in terms of FIG. 2, of the control piston 34 extends into a widened region of the recess 30, so that in this region between the valve element 32 and the wall of the recess 30, an annular chamber 52 is formed. A sleeve 54 is slipped onto the upper end region, in terms of FIG. 2, of the control piston 34 and is pressed with a sealing edge (without a reference numeral) against the end body 28 by a spring 55 that is braced on the control piston 34 via an annular collar 56.

The upper axial end face, in terms of FIG. 2, of the control piston 34 forms a hydraulic control face 58 that acts in the closing direction of the valve element 32. Together with the sleeve 54 and the end body 28, it defines a control chamber 60. This chamber communicates with the annular chamber 52 via an inlet throttle restriction 62, which is present in the sleeve 54. The control chamber 60 furthermore communicates with a 3/2-way switching valve 66, by means of a combined inlet and outlet throttle restriction 64 that is present in the end body 28. Depending on the switching position, this valve causes the inlet and outlet throttle restriction 64 to communicate selectively with the high-pressure connection 17 or the low-pressure connection 21. The annular chamber 52, via a conduit 68, likewise communicates constantly with the high-pressure connection 17, as does the pressure chamber 40 via a conduit 70.

It should be noted that in the exemplary embodiment shown in FIG. 2, the portion 46 of the nozzle needle 36 has the same diameter D1 as the control piston 34 (diameters D2 and D3). From this, it can also be seen that the two pressure faces 38*a* and 38*b* (upstream and downstream of the valve seat), projected onto a plane perpendicular to the longitudinal axis of the valve element 32, when the valve element has lifted from the valve seat, form the same total hydraulically effective surface area as the control face 58.

The fuel injection device 18 shown in FIG. 2 functions as follows: In the outset state, with the switching valve 66 currentless, the control chamber 60 communicates, via the combined inlet and outlet throttle restriction 64 as well as the inlet throttle restriction 62, with the high-pressure connection 17 and thus with the rail 16. The high rail pressure thus prevails in the control chamber 60. This pressure also prevails in the annular chamber 52 via the conduit 68 and in the pressure chamber 40 via the conduit 70. Because of certain unavoidable leakage flows as a result of the guidance of the nozzle needle 36 in the nozzle body 24 and of the control piston 34 in the main body 26, rail pressure prevails in the coupling chamber 50 as well.

Since as has already been mentioned above, when the valve element 32 is closed, only a portion of the pressure face 38*a* is acted upon by the high pressure prevailing in the pressure chamber 40, the total with the pressure face 38*b* is a somewhat lesser hydraulic force acting in the opening direction, compared to the force acting on the control face 58 in the closing direction. As a result of this force difference and of the spring 55, the valve element 32 is pressed against the valve seat in the region of the fuel outlet openings 42 (in this state, the control piston 34 rests with its end face 48 on the end face 51 of the nozzle needle 36). Accordingly, fuel is unable to exit through the fuel outlet openings 42.

If current is now supplied to the switching valve 66, the communication of the combined inlet and outlet throttle restriction 64 with the high-pressure connection 17 is interrupted, and this combined throttle restriction communicates instead with the low-pressure connection 21. As a result of the throttling action of the combined inlet and outlet throttle restriction 64 and of the inlet throttle restriction 62, the pressure in the control chamber 60 drops.

Because the difference in pressure and force between the end face 48 and the control face 58 of the control piston 34, the control piston 34 now begins to move upward in FIG. 2, counter to the force of the spring 55. The pressure in the coupling chamber 50 thus drops as a result of the increase in volume. Because of the difference in pressure and force that now occurs between the end face 51 and the pressure faces 38*a* and 38*b*, the nozzle needle 36 also moves upward in FIG. 2; that is, it lifts from its valve seat in the region of the fuel outlet openings 42, so that now the region of the pressure face 38*a* located downstream of the valve seat also acts in the opening direction, which reinforces the opening process. Thus fuel from the rail 16 can be injected into the combustion chamber 20, via the high-pressure connection 17, the conduit 68, the annular chamber 52, the conduit 70, the pressure chamber 40, and the fuel outlet openings 42.

To terminate an injection, the switching valve 66 is put back into its closed position, in which the inlet and outlet throttle restriction 64 communicates with the high-pressure connection 17. The pressure in the control chamber 60 now rises to rail pressure again. As a result, the control piston 34 is stopped and moved back in the closing direction, since the pressure in the coupling chamber 50 is initially less than in the control chamber 60. As a consequence, the pressure in the coupling chamber 50 rises up to the rail pressure, because of the reduction in volume.

In the case being observed now, in which the control piston 34 has the same diameter D2 as the portion 46 of the nozzle needle (diameter D1), the control piston 34 only now becomes seated again with the end face 48 on the end face 51 of the nozzle needle 36. By means of the spring 55, the intrinsically pressure-balanced valve element 32 is now closed. With a decreasing stroke of the valve element 32, the nozzle needle 36 begins to throttle the flow in the region of the pressure face 38*a*, causing the pressure prevailing there to drop. As a result, the closure of the valve element 32 is hydraulically reinforced. As soon as the nozzle needle 36 again rests on the valve seat in the region of the fuel outlet openings 42, the injection is terminated.

From the above functional description, it can be seen that by means of the coupling chamber 50, the nozzle needle 36 is hydraulically coupled with the control piston 34. The end face 48, coupling chamber 50, and end face 51 in this respect taken together form a hydraulic coupler 71. It can also be seen that between the pressure chamber 40 and the control chamber 60, in the form of the annular chamber 52 and the coupling chamber 50, only those chambers, surrounding the valve element 32, in which at least intermittently and at least approximately the high rail pressure applied also to the high-pressure connection 17 or in the rail 16, are present. In other words, the valve element 32 "floats" in high-pressure fuel.

Figure 3:
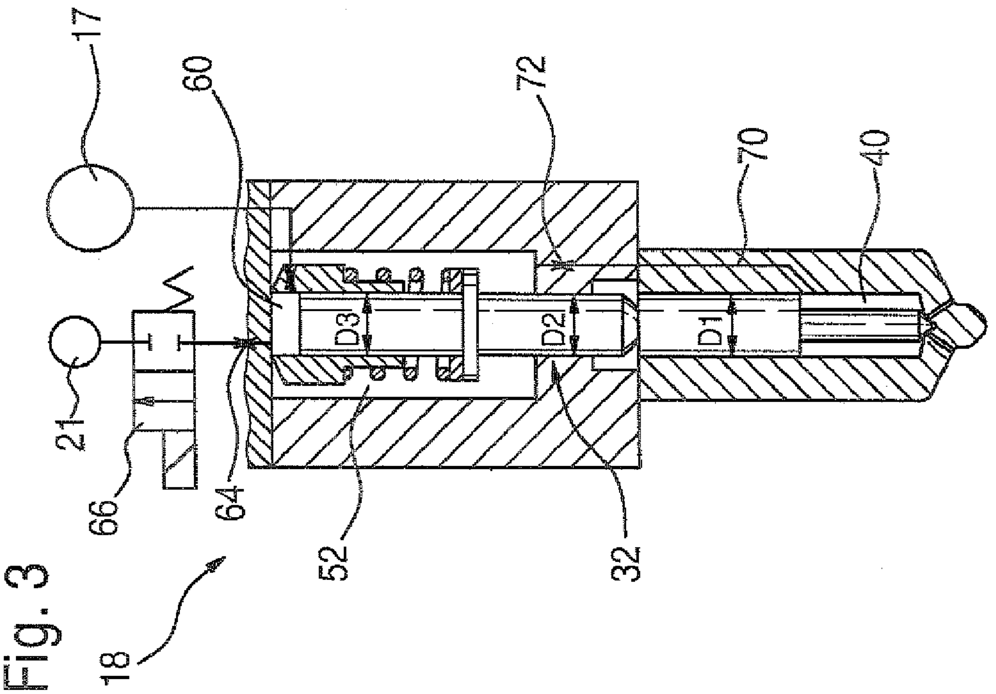
FIG. 3 is a view similar to FIG. 2 of a second embodiment.

In FIG. 3, an alternative embodiment of a fuel injection device 18 is shown. Here as well as in the exemplary embodiments that follow, those elements and regions that have equivalent functions to elements and regions described above are identified by the same reference numerals and will not be described again in detail. For the sake of simplicity, not all the reference numerals are entered, either.

In a distinction from the exemplary embodiment shown in FIG. 2, the switching valve 66 in the fuel injection device shown in FIG. 3 is embodied as a 2/2-way switching valve. With this valve, the control chamber 60, via the device that in this case is embodied only as an outlet throttle restriction 64, can either be made to communicate with the low-pressure connection 21 or be separated from it. Moreover, a throttle restriction 72 is provided in the conduit 70 that connects the annular chamber 52 to the pressure chamber 40. As a consequence, the pressure in the pressure chamber 40 when the valve element 32 is open is somewhat below the rail pressure. In this way, the closing process of the valve element 32 is simplified or accelerated. It is understood that the throttle restriction 72 may also be disposed at some other point between the high-pressure connection 17 and the pressure chamber 40, for instance in the conduit 68.

Figure 4:
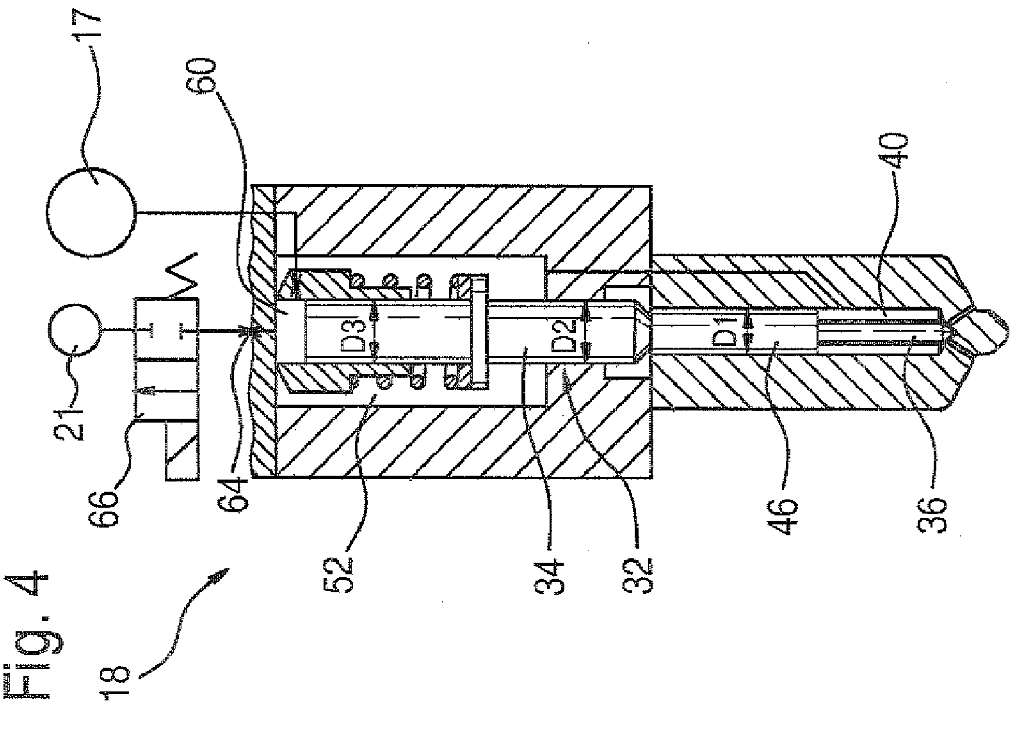
FIG. 4 is a view similar to FIG. 2 of a third embodiment.

In the embodiment shown in FIG. 4, the diameters D2 and D33 of the control piston 34 are larger than the diameter D1 of the portion 46 of the nozzle needle 36. As a consequence, during the opening process, or in other words with the switching valve 66 open, the pressure in the coupling chamber 50 drops, and the nozzle needle 36 very quickly returns to being in contact with the control piston 34. Moreover, as a result in the opening stroke of the valve element 32, by means of the hydraulic coupler 71, a "hydraulic spring" acting on the control piston 34 in the closing direction is tensed, and this reinforces the ensuing closing process, even given the fact that the valve element 32 in the open state is intrinsically pressure-balanced.

Figure 5:
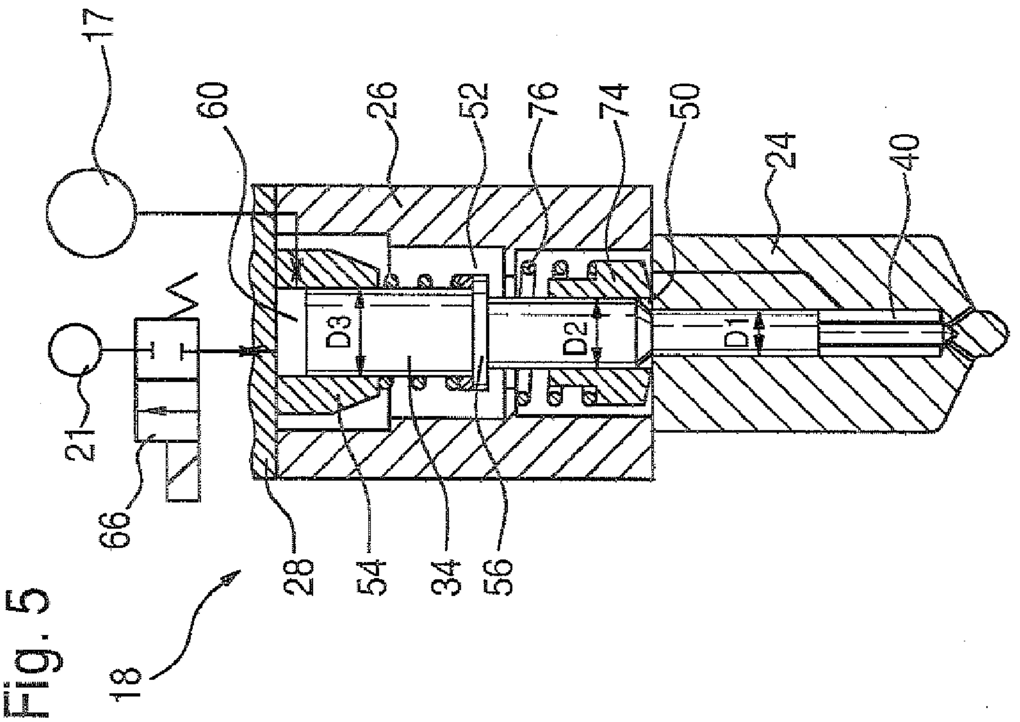
FIG. 5 is a view similar to FIG. 2 of a fourth embodiment.

In the embodiment shown in FIG. 5, the coupling chamber 50 is formed not between the valve element 32 and the housing 22 but rather between the valve element 32 and an additional sleeve 74. This sleeve is urged against the nozzle body 24 by a spring 76, which is braced on the main body 26. The control piston 34 in FIG. 5 furthermore has a larger diameter D3 above the annular collar 56 than below the annular collar 56 (diameter D2). This permits an additional degree of freedom in determining the closing and opening properties of the fuel injection device 18. The sleeve 74 permits a marked increase in size of the annular chamber 52, which simplifies the manufacture and design of the main body 26. Moreover, the increased volume of the annular chamber 52 assures an improved damping property, for instance for damping pressure waves. In addition, in the embodiment shown in FIG. 5, the sleeve 54 is integral with the end body 28.

Figure 6:
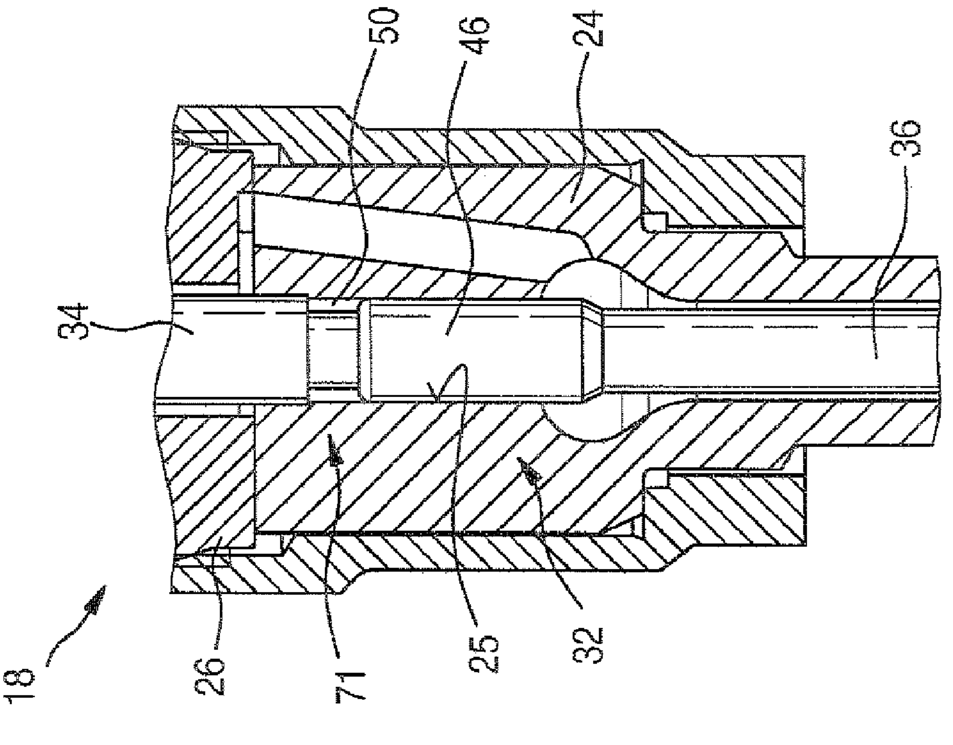
FIG. 6 is a view similar to FIG. 2 of a fifth embodiment.

In FIG. 6, a fifth embodiment of the fuel injection device is shown, which is substantially the same as the embodiments of FIGS. 2 through 5, except that the control piston 34, like the nozzle needle 36, is guided in the nozzle body 24 rather than in the main body 26. This has the advantage that the guides for the nozzle needle 36 and the control piston 34, which are formed by a bore 25 in the nozzle body 24, can be manufactured with high precision. The diameter D1 of the nozzle needle 36 and the diameter D2 of the control piston 34 can be the same or different, and as a result the volume of the coupling chamber 50 can be varied. By means of a portion of reduced diameter, provided on the control piston 34 or on the nozzle needle 36, the volume of the coupling chamber 50 can also be varied, and thus the performance of the coupler 71 can be varied.

Figure 7:
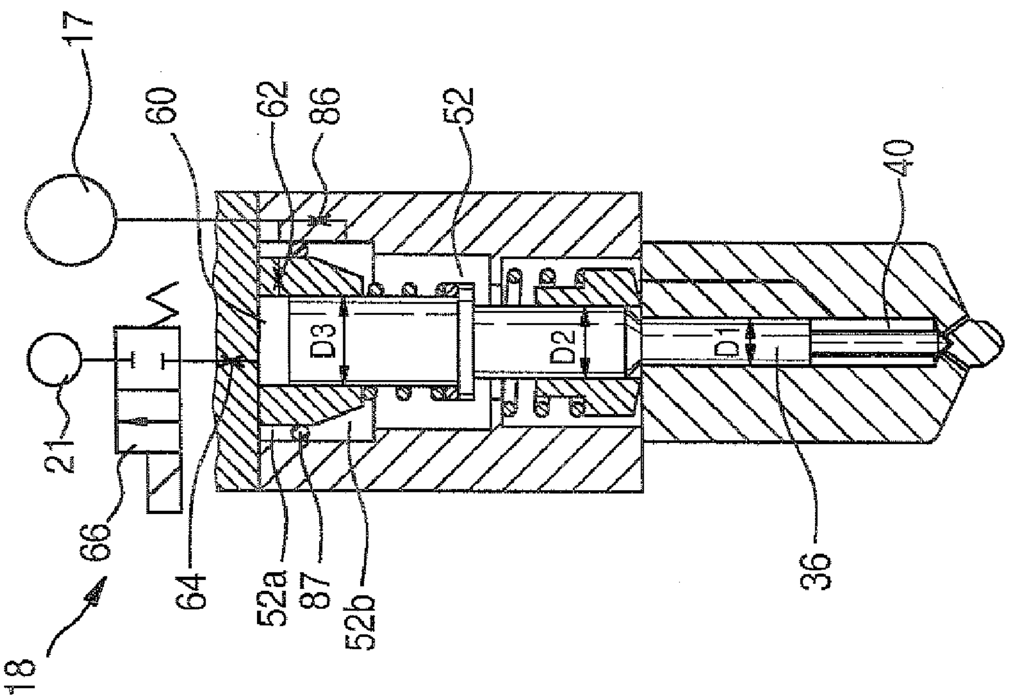
FIG. 7 is a view similar to FIG. 2 of a sixth embodiment.

In FIG. 7, a sixth embodiment of the fuel injection device is show, in which the fundamental construction is the same as in the embodiment of FIG. 5, but in which one additional throttle restriction 86 is provided, which is disposed in the connection of the pressure chamber 40 with the high-pressure connection 17. In the version in FIG. 7, the additional throttle restriction 86 is disposed in a branch of the conduit 68 leading to the pressure chamber 40, and upstream of the additional throttle restriction 86 the connection leads from the conduit 68 into the control chamber 60, in which the inlet throttle restriction 62 is disposed. Between the sleeve 54 and the main body 26, there is a sealing element, by which the annular chamber 52 is subdivided into two separate annular chamber regions 52*a* and 52*b*. The connection with the control chamber 60 extends though the annular chamber region 52*a* and the inlet throttle restriction 62 in the sleeve 54 into the control chamber 60. Thus the additional throttle restriction 86 is operative only in the connection with the pressure chamber 40, which discharges into the annular chamber region 52*b* and from there leads onward into the pressure chamber 40.

Figure 8:
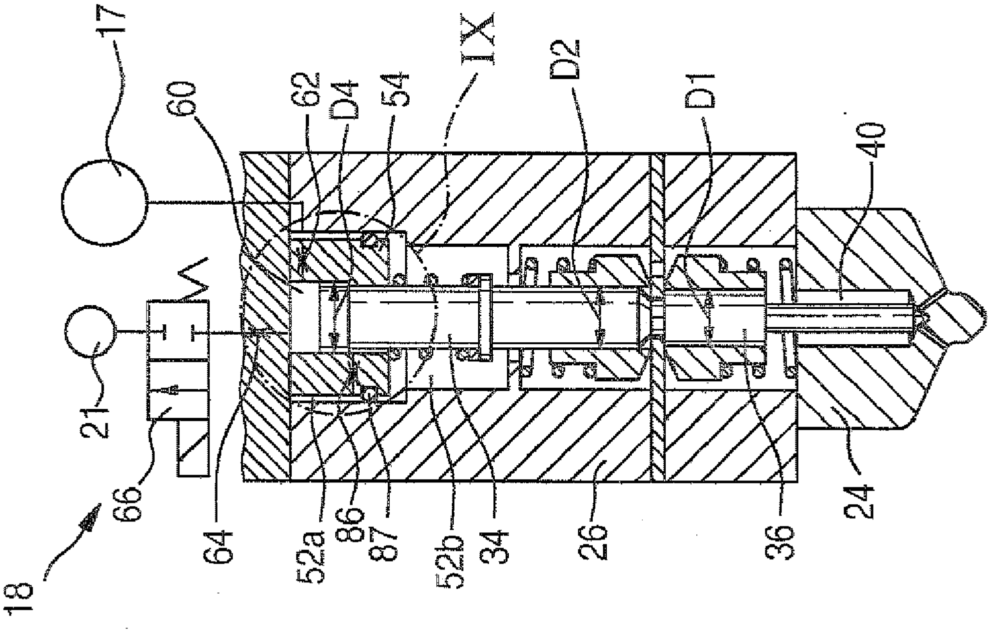
FIG. 8 is a view similar to FIG. 2 of a seventh embodiment.

In an embodiment shown in FIG. 8 which has been modified compared to FIG. 7, it is provided that the annular chamber 52 is subdivided into two separate annular chamber regions 52*a* and 52*b* by a sealing element 87 fastened between the main body 26 and the sleeve 54. The control piston 34, on its end disposed in the sleeve 54, has an enlarged diameter D4, by way of which the control piston 34 is guided in the sleeve 54. Hence there is an annular gap between the remaining shaft, disposed in the sleeve 54, of the control piston 34 and the sleeve 54. The high-pressure connection 17 discharges into the annular chamber region 52*a*, from which the connection into the control chamber 60 with the inlet throttle restriction 62 leads away. A connection into the annular gap between the shaft of the control piston 34 and the sleeve 54 also leads away from the annular chamber region 52*a* via the additional throttle restriction 86, and the annular gap is in communication with the annular chamber region 52*b*. The communication of the annular chamber region 52*b* and hence of the pressure chamber 40 with the high-pressure connection 17 is thus effected via the additional throttle restriction 86, which however is not operative for the communication of the control chamber 60 with the high-pressure connection 17.

Figure 9:
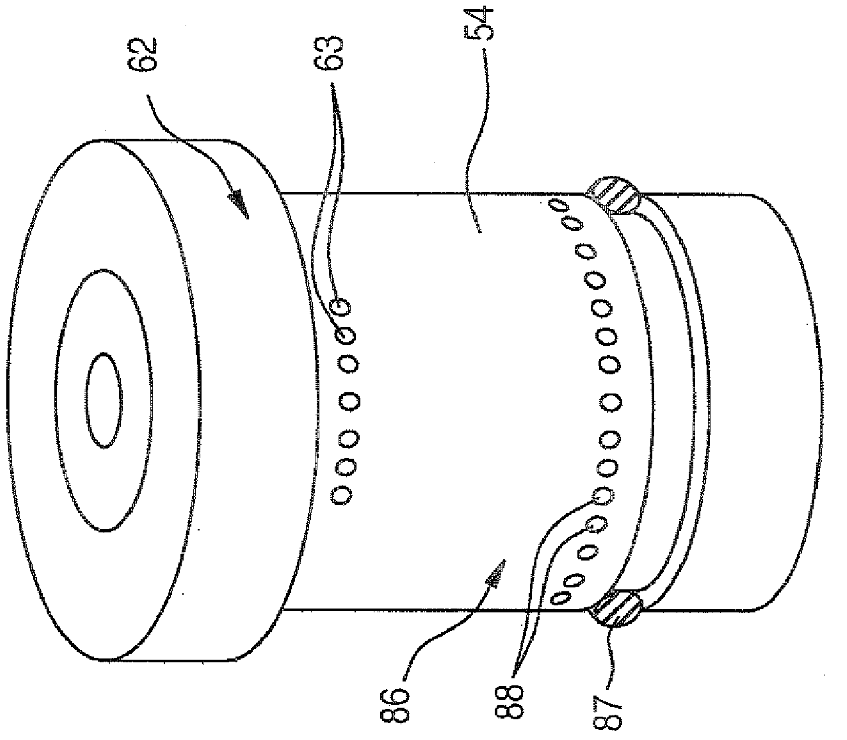
FIG. 9, a detail marked IX of FIG. 8 in a three-dimensional view.

In FIG. 9, a further embodiment of the fuel injection device is shown, which is suitable in particular for the embodiment of FIG. 8 but is also suitable for all the other embodiments described above. In FIG. 9, the sleeve 54 is shown, in which the control piston 34 is guided with its end of increased diameter. The inlet throttle restriction 62 is formed here by a plurality of bores 63 of very small diameter, for instance approximately 4 to 9 such bores, which are preferably made in the sleeve 54 by laser drilling. The bores 63 are distributed over the circumference of the sleeve 54, and the diameter of the bores 63 can amount to approximately 0.1 mm. The inlet and/or outlet region of the bores 63 may be rounded, for instance by means of a hydroerosive process. The bores 63, in addition to the throttling function, also have the function of a filter, so that an additional filter in the region of the high-pressure connection 17 may optionally be dispensed with. Clogging of the inlet throttle restriction 62 is unlikely, because of the multiple bores 63. The additional throttle restriction 86 in the communication with the pressure chamber 40 can also be formed by a plurality of bores 88 of small diameter in the sleeve 54, as is shown in FIG. 9. For forming the throttle restriction 86, approximately 20 to 50 bores 88, for instance, may be provided, which can each have a diameter of approximately 0.1 mm. The bores 88 are distributed over the circumference of the sleeve 54. Also shown in FIG. 9, is the sealing element 87, by which the two annular chamber regions 52*a* and 52*b* of FIG. 8 are separated from one another.

The foregoing relates to a preferred exemplary embodiment of the invention, it being understood that other variants and embodiments thereof are possible within the spirit and scope of the invention, the latter being defined by the appended claims.

The invention claimed is:

1. A fuel injection device for an internal combustion engine with direct fuel injection, the device comprising a housing with an annular chamber, a pressure chamber, and a hydraulic coupler having a coupling chamber disposed between the annular chamber and the pressure chamber, a high-pressure connection to a common rail, the annular chamber and the pressure chamber being constantly in communication with the high pressure connection to the common rail, a multiple part valve element disposed in the annular chamber and the pressure chamber of the housing, at least two parts of the multiple part valve element having opposed ends within the coupling chamber of the hydraulic coupler, a valve seat located in a region of at least one fuel outlet opening, the multiple part valve element cooperating with the valve seat, and the hydraulic coupler coupling the opposed ends of the at least two parts of the valve element to one another, wherein movement of one of the opposed ends of one of the parts of the valve element in a direction towards the valve seat causes hydraulic pressure in the hydraulic coupler to increase and movement of said one of the opposed ends in a direction away from the valve seat causes hydraulic pressure in the hydraulic coupler to decrease while high pressure from the common rail prevails in the annular chamber and the pressure chamber.

2. The fuel injection device as defined by claim 1, wherein the valve element comprises a hydraulically operative control face which defines a control chamber in which during operation a variable control pressure prevails.

3. The fuel injection device as defined by claim 2, wherein the valve element comprises a hydraulic pressure face which defines the pressure chamber that communicates with the high-pressure connection; and wherein the device is embodied such that in operation, at least intermittently and at least approximately, the high fuel pressure prevailing in the high-pressure connection prevails in chambers which are located between the control chamber and the pressure chamber and surround surrounds the valve element.

4. The fuel injection device as defined by claim 1, further comprising a sleeve that separates the coupling chamber of the hydraulic coupler from the annular chamber that communicates with the high-pressure connection.

5. The fuel injection device as defined by claim 3, further comprising a sleeve that separates the coupling chamber of the hydraulic coupler from the annular chamber that communicates with the high-pressure connection.

6. The fuel injection device as defined by claim 1, wherein the at least two parts of the valve element are guided in a same housing part of the fuel injection device.

7. The fuel injection device as defined by claim 3, wherein the at least two parts of the valve element are guided in a same housing part of the fuel injection device.

8. The fuel injection device as defined by claim 4, wherein the at least two parts of the valve element are guided in a same housing part of the fuel injection device.

9. The fuel injection device as defined by claim 1, wherein hydraulically operative end faces of the at least two parts of the valve element are located in the hydraulic coupler and are of different sizes.

10. The fuel injection device as defined by claim 3, wherein hydraulically operative end faces of the at least two parts of the valve element are located in the hydraulic coupler and are of different sizes.

11. The fuel injection device as defined by claim 9, wherein a hydraulically operative end face, located in the hydraulic coupler, of the part of the valve element, which part is located remote from a fuel outlet opening, is larger than a hydraulically operative end face, located in the hydraulic coupler, of the other part.

12. The fuel injection device as defined by claim 3, wherein the pressure face that is hydraulically operative when the valve element is open and the hydraulically operative control face are at least approximately the same size.

13. The fuel injection device as defined by claim 4, wherein the pressure face that is hydraulically operative when the valve element is open and the hydraulically operative control face are at least approximately the same size.

14. The fuel injection device as defined by claim 3, wherein the hydraulically operative control face is larger than the pressure face that is hydraulically operative when the valve element is open.

15. The fuel injection device as defined by claim 3, wherein the pressure chamber communicates with the high-pressure connection via a flow throttle restriction.

16. The fuel injection device as defined by claim 4, wherein the pressure chamber communicates with the high-pressure connection via a flow throttle restriction.

17. The fuel injection device as defined by claim 2, wherein the control chamber communicates at least indirectly with the high-pressure connection via a flow throttle restriction, and the device further comprises an electromagnetic switching valve operable to connect the control chamber with a low-pressure connection.

18. The fuel injection device as defined by claim 15, wherein the control chamber communicates at least indirectly with the high-pressure connection via a flow throttle restriction, and the device further comprises an electromagnetic switching valve operable to connect the control chamber with a low-pressure connection.

19. The fuel injection device as defined by claim 18, wherein the switching valve is operable to connect the control chamber with either the low-pressure connection or the high-pressure connection.

20. The fuel injection device as defined by claim 15, wherein the flow throttle restriction is formed by a plurality of bores of small diameter.

* * * * *